Patented Oct. 7, 1952

2,612,727

UNITED STATES PATENT OFFICE 2,612,727

METHOD OF MAKING ULTRAVIOLET-TRANSMITTING HIGH-SILICA GLASSES

Martin E. Nordberg, Corning, N. Y., assignor to Corning Glass Works, Corning, N. Y., a corporation of New York No Drawing. Application April 21, 1950, Serial No. 157,404

9 Claims. (Cl. 49—79)

This invention relates to the treatment of glasses of the type disclosed in Patents Nos. 2,106,744 and 2,221,709, and particularly to a method of improving the properties and usefulness of such glasses for ultraviolet-emitting lamp envelopes.

According to such patents, an article composed of a glass containing over 94% $SiO_2$ can be produced by melting and shaping a particular easily meltable glass of lower silica content and extracting therefrom soluble, nonsiliceous constituents by leaching to leave a higly siliceous structure retaining its original shape and having a multiplicity of intercommunicating submicroscopic pores, which porous glass can be consolidated to a nonporous condition by heating.

On account of its high annealing point (on the order of 900° C.), such high-silica glass should be particularly adapted for the manufacture of tubes for use as envelopes for medium-pressure, mercury arc lamps; but such use is attended by difficulties in practice. The usual preliminary "baking out" of an envelope of such glass at the temperature (400° to 800° C.) customarily employed to eliminate gas from the interior of tubing to be utilized for such purpose is not entirely effective, with the result that a continuous, small but objectionable evolution of water vapor and other gas from the inner surface of such an envelope occurs during operation of a lamp made therefrom, whereby the useful life of the lamp is shortened. Moreover, any trace of iron remaining in the porous glass following leaching, is in part present in the ferric state after consolidation and causes an undesirable degree of absorption of ultraviolet radiations, an objectionable factor in lamps intended for ultraviolet emission.

In my copending application Serial No. 657,916, filed March 28, 1946, now Patent 2,505,001, I have described and claimed a method for treating tubes of such porous high-silica glass, during consolidation of the glass, to reduce the iron to the less absorptive ferrous state and to eliminate water vapor and other dissolved gas from the glass. Such method comprises heating the porous glass tubes in an atmosphere of a hydrogen-containing reducing gas to reduce the iron, and thereafter heating the tubes to the consolidating temperature in a substantial vacuum for a time sufficient to consolidate the glass to a nonporous condition. As a result of such treatment the ultraviolet transmission of the glass is improved and its water and gas content is decreased to a negligible value, thereby increasing the efficiency and effective life of lamps made from such tubes.

In practicing such method, however, certain practical difficulties are encountered. For example, such porous glass tubes, when heated at a temperature sufficient to close the pores in the glass, tend to warp and flatten to an oval shape. When such tubes are so heated under atmospheric pressure, it is readily possible to rotate them about a longitudinal axis and thus avoid such warping and flattening. When such tubes are so heated in a vacuum in accordance with the method of my copending application, however, it is impossible to satisfactorily rotate them without the use of very special equipment which tends to render the operation prohibitive in cost. Consequently, tubes produced by such vacuum-firing method which are warped or out of round must subsequently be reheated under atmospheric pressure in a rotating furnace at extra expense, and even then they may not be satisfactory in contour.

I have now discovered that the difficulties and disadvantages of such vacuum-firing procedure can be practically eliminated with substantial avoidance of warping and flattening of the tubes, while at the same time satisfactorily decreasing the water and gas content of the glass, by a special treatment of such tubes under anhydrous conditions while they are being heated to effect consolidation of the porous glass.

The present invention comprises heating the porous glass tubes in an atmosphere of a reducing gas, preferably an atmosphere containing hydrogen, to a temperature insufficient to effect substantial consolidation, and thereafter heating them, advantageously at substantially atmospheric pressure, in an anhydrous atmosphere which is free of any water-forming constituent and which will not cause substantial oxidation of ferrous iron present in the glass at the consolidation temperature, for a time and at a temperature insufficient to fuse the glass but sufficient to consolidate it to a nonporous condition. By such procedure not only is it possible to effect substantial reduction of any ferric iron present in the glass and satisfactory removal of water and gas therefrom, but also conventional equipment can be used for consolidation of the porous glass tubes and warping and flattening of the tubes can thus be avoided.

In the practice of the present procedure, the porous glass tubes are advantageously subjected to an initial dehydration treatment for elimination of water loosely held within the pores. This dehydration is effected by heating the tubes at a temperature ranging from about 600° to 900° C. Heating-up should be sufficiently slow to avoid rupture of the glass by too rapid drying.

The initially dehydrated glass tubes are then heated in the reducing atmosphere at a temperature ranging from about 900° to 1050° C. for reduction of any ferric iron that may be present. Although use of the reducing atmosphere can be begun at a temperature below 900° C., no particular advantage is derived thereby. The use of the reducing atmosphere at temperatures above about 1050° C. is not particularly desirable, since consolidation of the porous glass already begins to take place to an appreciable extent at such point.

For this reason replacement of the reducing atmosphere by the anhydrous atmosphere is preferably undertaken at temperatures ranging between 950° and 1050° C., and the tubes are desirably maintained at this temperature for a time sufficient to effect substantial elimination of any residual water and gas before any appreciable consolidation of the porous glass takes place. Complete consolidation of the porous glass is then effected in the presence of such anhydrous atmosphere by heating the glass to a temperature in the range between about 1150° and 1250° C. with further elimination of water and gas from the glass.

The anhydrous atmosphere may be composed of a gas selected from the group consisting of nitrogen, carbon dioxide, carbon monoxide, sulfur dioxide, helium, neon and argon. Each of these gases is suitable for the present purpose in that water cannot be formed therefrom and it does not cause any appreciable reoxidation of the ferrous iron within the range of temperatures at which consolidation of the porous glass is effected.

In a preferred manner of carrying out the invention, tubes composed of the porous glass produced in accordance with the methods described in Patents Nos. 2,106,744 and 2,221,709 are advantageously initially slowly heated and held at 600° to 650° C. for 2 hours, or at higher temperatures up to 900° C. for correspondingly shorter times to remove most of the water from the glass. Such preliminary heating preferably is done in a preheating furnace.

The porous glass tubes are then transferred to a rotatable muffle furnace heated to 900° to 1050° C., and the air within the muffle is displaced by a reducing gas at substantially atmospheric pressure in order to insure reduction of any ferric iron present in the glass to ferrous iron. The tubes are desirably maintained in this temperature range for ¼ to 1 hour. As the reducing gas, hydrogen or a nonexplosive mixture consisting of 92% nitrogen and 8% hydrogen is suitable. A cheaper reducing gas is natural gas that has been partially burned and cracked, which gas can be produced in the known manner by passage of natural gas through a semicombustion chamber.

The atmosphere of reducing gas in the furnace is thereafter displaced by anhydrous nitrogen at substantially atmospheric pressure, and the temperature is held at 1000° to 1050° C. for ½ to 4 hours to insure satisfactory removal of water and gas from the glass. The temperature thereafter is raised to 1200° to 1225° C. and is maintained there for at least 10 minutes to consolidate the porous glass to the nonporous condition. The furnace is then cooled. The flow of anhydrous nitrogen into the furnace is preferably continued until the temperature has cooled to about 1000° C. in order to prevent reoxidation of the ferrous oxide, and the gas is then shut off. The glass may then be removed from the furnace.

It is preferred to use nitrogen as the anhydrous atmosphere for the consolidation treatment but carbon dioxide, carbon monoxide or sulfur dioxide may be substituted therefor. The inert gases helium, neon or argon may also be used with good results but at an increase in cost. Hydrogen, although nonoxidizing, is not suitable because, at the temperatures employed in the consolidating step, water is continuously formed through an apparent reaction of the hydrogen with some ingredient in the glass. Hence its use in lieu of nitrogen does not effect the requisite dehydration of the glass.

If desired, the entire heat treatment can be carried out in a single furnace, the reducing gas being introduced at 900° to 1000° C. until reduction is complete and the anhydrous nitrogen being introduced at about 1000° C. The temperature can be increased either gradually or stepwise.

Although the present method has been described in connection with the treatment of porous glass tubes, other articles of the same type of glass may also be advantageously treated by such method.

I claim:

1. The process of treating an article composed of a glass containing over 94% $SiO_2$ and having throughout its mass a multiplicity of submicroscopic intercommunicating pores, said glass containing a trace of ferric iron, which includes heating the article in a hydrogen-containing reducing atmosphere to a temperature sufficient to cause substantial reduction of the ferric iron present therein but insufficient to effect substantial consolidation of the glass and thereafter heating the article in an anhydrous atmosphere composed of a gas selected from the group consisting of nitrogen, carbon dioxide, carbon monoxide, sulfur dioxide, helium, neon, and argon to a temperature insufficient to fuse the glass but sufficient to consolidate it to a nonporous condition until consolidation is complete.

2. The process of treating an article composed of a glass containing over 94% $SiO_2$ and having throughout its mass a multiplicity of submicroscopic intercommunicating pores, said glass containing a trace of ferric iron, which includes heating the article in a hydrogen-containing reducing atmosphere to a temperature sufficient to cause substantial reduction of the ferric iron present therein but insufficient to effect substantial consolidation of the glass and thereafter heating the article in an anhydrous atmosphere of nitrogen to a temperature insufficient to fuse the glass but sufficient to consolidate it to a nonporous condition until consolidation is complete.

3. The process of treating an article composed of a glass containing over 94% $SiO_2$ and having throughout its mass a multiplicity of submicroscopic intercommunicating pores, said glass containing a trace of ferric iron, which includes heating the article in a hydrogen-containing reducing atmosphere to a temperature sufficient to cause substantial reduction of the ferric iron present therein but insufficient to effect substantial consolidation of the glass and thereafter heating the article in an anhydrous atmosphere of carbon dioxide to a temperature insufficient to fuse the glass but sufficient to consolidate it to a nonporous condition until consolidation is complete.

4. The process of treating an article composed of a glass containing over 94% $SiO_2$ and having throughout its mass a multiplicity of submicroscopic intercommunicating pores, said glass containing a trace of ferric iron, which includes heating the article in a hydrogen-containing reducing atmosphere to a temperature sufficient to cause substantial reduction of the ferric iron present therein but insufficient to effect substantial consolidation of the glass and thereafter heating the article in an anhydrous atmosphere of carbon monoxide to a temperature insufficient to fuse the glass but sufficient to consolidate it to a nonporous condition until consolidation is complete.

5. The process of treating an article composed of a glass containing over 94% $SiO_2$ and having throughout its mass a multiplicity of submicroscopic intercommunicating pores, said glass containing a trace of ferric iron, which includes heating the article in a hydrogen-containing reducing atmosphere to a temperature sufficient to cause substantial reduction of the ferric iron present therein but insufficient to effect substantial consolidation of the glass and thereafter heating the article in an anhydrous atmosphere of sulfur dioxide to a temperature insufficient to fuse the glass but sufficient to consolidate it to a nonporous condition until consolidation is complete.

6. The process of treating an article composed of a glass containing over 94% $SiO_2$ and having throughout its mass a multiplicity of submicroscopic intercommunicating pores, said glass containing a trace of ferric iron, which includes heating the article in a hydrogen-containing reducing atmosphere to a temperature sufficient to cause substantial reduction of the ferric iron present therein but insufficient to effect substantial consolidation of the glass and thereafter heating the article in an anhydrous atmosphere of helium to a temperature insufficient to fuse the glass but sufficient to consolidate it to a nonporous condition until consolidation is complete.

7. The process of treating an article composed of a glass containing over 94% $SiO_2$ and having throughout its mass a multiplicity of submicroscopic intercommunicating pores, said glass containing a trace of ferric iron, which includes heating the article in a hydrogen-containing reducing atmosphere within the range 900° to 1050° C., replacing the reducing atmosphere with an anhydrous atmosphere composed of a gas selected from the group consisting of nitrogen, carbon dioxide, carbon monoxide, sulfur dioxide, helium, neon and argon, maintaining the article in such anhydrous atmosphere within the range of 950° to 1050° C. to substantially eliminate any residual water and gas from the glass, and thereafter heating the article within the range 1150° to 1250° C. in such anhydrous atmosphere until the glass is consolidated to a nonporous condition.

8. The process of treating an article composed of a glass containing over 94% $SiO_2$ and having throughout its mass a multiplicity of submicroscopic intercommunicating pores, said glass containing a trace of ferric iron, which includes slowly heating the article to a temperature within the range 600° to 900° C. to dehydrate the glass without rupture, then heating it within the range 900° to 1050° C. in a hydrogen-containing reducing atmosphere, replacing the reducing atmosphere with an anhydrous atmosphere of nitrogen, maintaining the article in such anhydrous nitrogen atmosphere within the range 950° to 1050° C. to substantially eliminate any residual water and gas from the glass, and thereafter heating it within the range 1150° to 1250° C. in such anhydrous nitrogen atmosphere until the glass is consolidated to a nonporous condition.

9. The process of treating an article composed of a glass containing over 94% $SiO_2$ and having throughout its mass a multiplicity of submicroscopic intercommunicating pores, said glass containing a trace of ferric iron, which includes slowly heating the article to a temperature within the range 600° to 900° C. to dehydrate the glass without rupture, then heating it for ¼ to 1 hour within the range 900° to 1050° C. in an atmosphere of a hydrogen-containing reducing gas which contains hydrogen, replacing the hydrogen-containing gas with an anhydrous atmosphere of nitrogen, and thereafter heating the article in the anhydrous nitrogen atmosphere for ¼ to 4 hours within the range 1000° to 1050° C. to substantially eliminate any residual water and gas from the glass and then for at least 10 minutes within the range 1200° to 1225° C. to consolidate the glass to a nonporous condition.

MARTIN E. NORDBERG.

REFERENCES CITED

The following references are of record in the file of this patent:

UNITED STATES PATENTS

| Number | Name | Date |
|---|---|---|
| 2,106,744 | Hood | Feb. 1, 1938 |
| 2,279,168 | Kalischer et al. | Apr. 7, 1942 |
| 2,303,756 | Nordberg et al. | Dec. 1, 1942 |
| 2,505,001 | Nordberg | Apr. 25, 1950 |